United States Patent
Du et al.

(10) Patent No.: US 12,025,527 B1
(45) Date of Patent: Jul. 2, 2024

(54) POSITION LIMITING PROTECTION DEVICE AND ITS WORKING METHOD FOR TEST PLATFORM OF TRIAXIAL AIR-BEARING TURNTABLE

(71) Applicant: HUNAN LANYUE Mechanical and Electrical Technology Co., Ltd, Changsha (CN)

(72) Inventors: Jinbang Du, Changsha (CN); Jianjun Hou, Changsha (CN); Jianmin Wang, Changsha (CN); Wugang Tian, Changsha (CN)

(73) Assignee: HUNAN LANYUE MECHANICAL AND ELECTRICAL TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 18/433,448

(22) Filed: Feb. 6, 2024

(30) Foreign Application Priority Data

Feb. 6, 2023 (CN) .......................... 202310067973.6

(51) Int. Cl.
*G01M 1/04* (2006.01)
*G01M 13/04* (2019.01)

(52) U.S. Cl.
CPC .............. *G01M 1/04* (2013.01); *G01M 13/04* (2013.01)

(58) Field of Classification Search
CPC ................................. G01M 1/04; G01M 13/04
See application file for complete search history.

(56) References Cited

U.S. PATENT DOCUMENTS

| 3,583,815 A | * | 6/1971 | Kersey, Jr. | ............. G01M 5/00 73/147 |
| 2007/0195653 A1 | | 8/2007 | Yassour et al. | |
| 2016/0124437 A1 | * | 5/2016 | Chen | ...................... G05B 19/27 700/186 |

FOREIGN PATENT DOCUMENTS

| CN | 105045136 A | | 11/2015 | |
| CN | 105321398 A | * | 2/2016 | |
| CN | 106066632 A | * | 11/2016 | ............. G05B 19/19 |
| CN | 106297520 A | | 1/2017 | |
| CN | 109795724 A | * | 5/2019 | |
| CN | 113406887 A | | 9/2021 | |
| CN | 214274253 U | | 9/2021 | |
| JP | H09327190 A | | 12/1997 | |

\* cited by examiner

*Primary Examiner* — Paul M. West
(74) *Attorney, Agent, or Firm* — Bayramoglu Law Offices LLC

(57) ABSTRACT

A position limiting protection device for a test platform of a triaxial air-bearing turntable and its working method are provided. The triaxial air-bearing turntable is installed on a support frame and includes an air bearing support seat and an air bearing hemisphere. A test platform is placed on an adapter plate, which is placed above the air bearing hemisphere. The position limiting protection device includes three top rods and three annular parts, which are sequentially spaced to form a position limiting ring, the position limiting ring is located below the adapter plate and surrounds the air bearing hemisphere. The position limiting ring is spaced at a certain distance from the air bearing hemisphere, each annular part is fixed on a support frame, and the top rods are controlled to rise or fall to limit the movement of the test platform.

4 Claims, 4 Drawing Sheets

POSITION LIMITING PROTECTION DEVICE AND ITS WORKING METHOD FOR TEST PLATFORM OF TRIAXIAL AIR-BEARING TURNTABLE

CROSS-REFERENCE TO THE RELATED APPLICATIONS

This application is based upon and claims priority to Chinese Patent Application No. 202310067973.6, filed on Feb. 6, 2023, the entire contents of which are incorporated herein by reference.

TECHNICAL FIELD

The invention relates to triaxial air-bearing turntable, in particular to a position limiting protection device for a test platform of a triaxial air-bearing turntable, and its working method.

BACKGROUND

Working environment of a spacecraft is gravity free, so many components of the spacecraft need to simulate a microgravity and low friction test environment when tested on the ground. Some subsystems of the spacecraft require the ability to achieve three degrees of freedom in space motion. Therefore, a triaxial air-bearing turntable is a very good choice.

When placing a test platform with test components or subsystems on a triaxial air-bearing turntable for testing, there are following problems that may occur. When the test platform is not leveled, it will tilt towards one side, even causing the test platform to roll over. When the test platform is leveled, an executing mechanism can control the test platform to pitch or roll, which may exceed a set deflection angle. When the test platform completes a test and an air source of an air bearing support seat is turned off, the test platform directly contacts an air bearing hemisphere, causing damage.

SUMMARY

In order to overcome the defects of the prior art, the technical problem to be solved by the invention is to provide a position limiting protection device for a test platform of a triaxial air-bearing turntable, which can prevent the test platform from tilting towards one side when the test platform is not leveled, prevent the test platform from exceeding a set deflection angle when an executing mechanism controls the test platform to pitch or roll, and prevent the test platform from directly contacting the air bearing hemisphere, causing damage, when the air source of the air bearing support seat is turned off.

The technical scheme of the invention is as follows.

In the position limiting protection device for a test platform of a triaxial air-bearing turntable, the triaxial air-bearing turntable is installed on a support frame (1) and comprises an air bearing support seat and an air bearing hemisphere. The air bearing support seat provides high-pressure gas lubrication to make the air bearing hemisphere freely roll and rotate in a ball socket of the air bearing support seat. A test platform is placed on an adapter plate, which is placed above the air bearing hemisphere.

The position limiting protection device (2) comprises three top rods (21) and three annular parts (22), which are sequentially spaced to form a position limiting ring, the position limiting ring is located below the adapter plate and surrounds the air bearing hemisphere. The position limiting ring is spaced at a certain distance from the air bearing hemisphere, each annular part is fixed on a support frame, and the top rods are controlled to rise or fall to limit the movement of the test platform.

The test platform may tilt before it is fully leveled. The position limiting ring of the position limiting protection device according to the present invention surrounds it. The position limiting ring is located below the adapter plate and surrounds the air bearing hemisphere. The position limiting ring is spaced at a certain distance from the air bearing hemisphere, which can prevent the test platform from overturning when it tilts. After the test platform is leveled, the test platform, adapter plate, and air bearing hemisphere rotate together under the control of the executing mechanism on the test platform. When the executing mechanism controls the test platform to pitch or roll, the position limiting ring of the position limiting protection device can prevent the test platform from continuing to deflect and prevent it from exceeding a set deflection angle. Each annular part is fixed on a support frame, and the top rods are controlled to rise or fall to limit the movement of the test platform. When dismantling the test platform, the top rods are controlled to rise, so that the three top rods can support the test platform and move upwards for a distance to separate the air bearing hemisphere located below the test platform from the air bearing support seat, preventing direct contact with a spherical surface of the air bearing hemisphere and causing damage when the air source of the air bearing support seat is closed.

A working method for the position limiting protection device for a test platform of a triaxial air-bearing turntable is also provided, which, comprising the following steps:
(1) preventing the test platform from overturning, when the test platform is not leveled and the test platform tilts towards one side,
(2) preventing the test platform from exceeding a set deflection angle when an executing mechanism controls the test platform to pitch or roll, and
(3) preventing the test platform from directly contacting the air bearing hemisphere, causing damage, when the air source of the air bearing support seat is turned off, after the test platform completes the test, the position limiting protection device controls the top rod to move upwards until the top rod presses against the test platform and moves a certain distance to separate the air bearing hemisphere located below the test platform from the air bearing support seat.

DETAILED DESCRIPTION OF THE EMBODIMENTS

Figure 1:
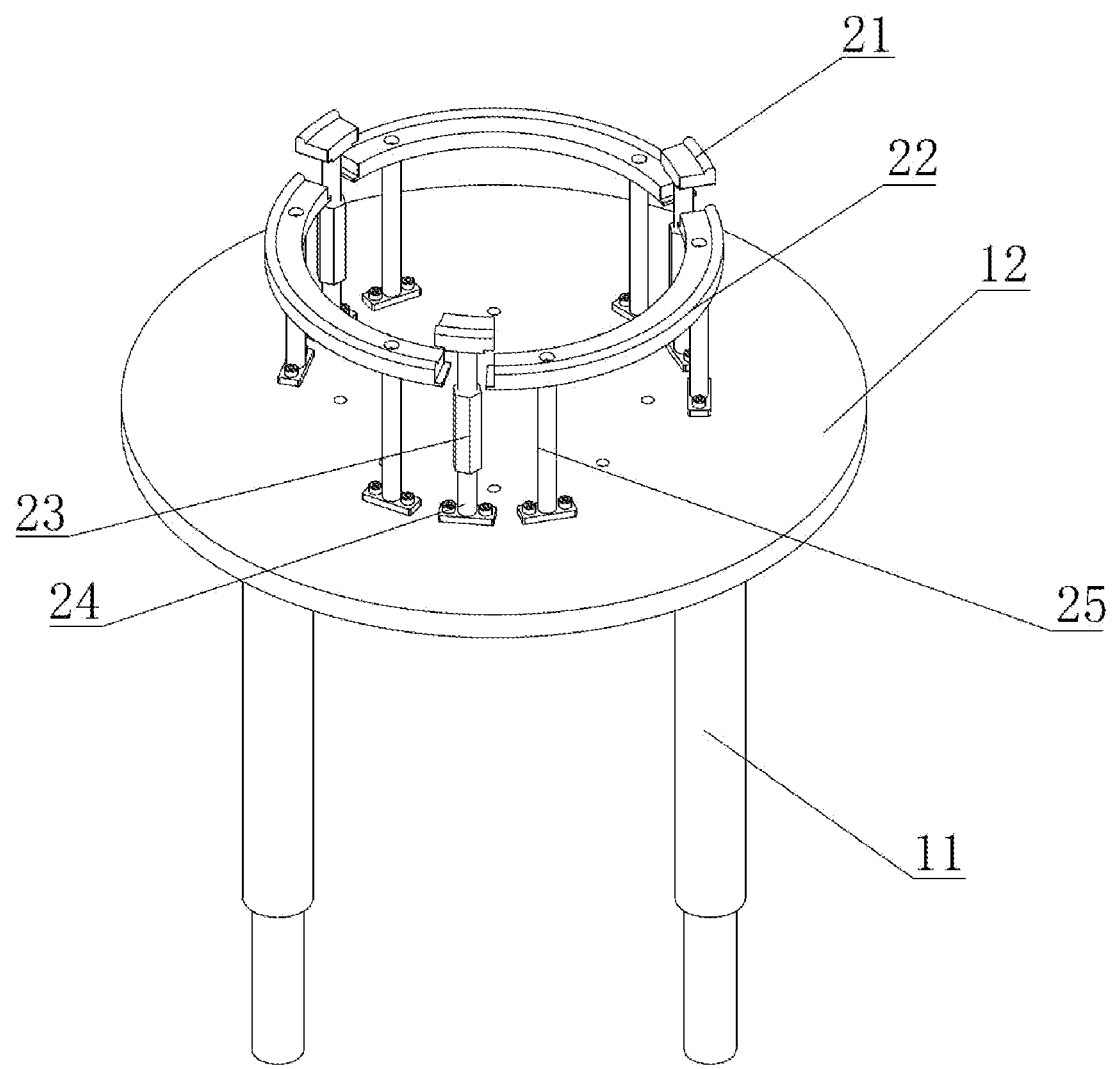
FIG. 1 is a schematic diagram showing the position limiting protection device for a test platform of a triaxial air-bearing turntable according to the present invention, where the top rods rise.

As shown in FIGS. 1-4, in the position limiting protection device for a test platform of a triaxial air-bearing turntable, the triaxial air-bearing turntable is installed on a support frame (1) and comprises an air bearing support seat and an air bearing hemisphere. The air bearing support seat provides high-pressure gas lubrication to make the air bearing hemisphere freely roll and rotate in a ball socket of the air bearing support seat. A test platform is placed on an adapter plate, which is placed above the air bearing hemisphere.

The position limiting protection device (2) comprises three top rods (21) and three annular parts (22), which are sequentially spaced to form a position limiting ring, the position limiting ring is located below the adapter plate and surrounds the air bearing hemisphere. The position limiting ring is spaced at a certain distance from the air bearing hemisphere, each annular part is fixed on a support frame, and the top rods are controlled to rise or fall to limit the movement of the test platform.

The test platform may tilt before it is fully leveled. The position limiting ring of the position limiting protection device according to the present invention surrounds it. The position limiting ring is located below the adapter plate and surrounds the air bearing hemisphere. The position limiting ring is spaced at a certain distance from the air bearing hemisphere, which can prevent the test platform from overturning when it tilts. After the test platform is leveled, the test platform, adapter plate, and air bearing hemisphere rotate together under the control of the executing mechanism on the test platform. When the executing mechanism controls the test platform to pitch or roll, the position limiting ring of the position limiting protection device can prevent the test platform from continuing to deflect and prevent it from exceeding a set deflection angle. Each annular part is fixed on a support frame, and the top rods are controlled to rise or fall to limit the movement of the test platform. When dismantling the test platform, the top rods are controlled to rise, so that the three top rods can support the test platform and move upwards for a distance to separate the air bearing hemisphere located below the test platform from the air bearing support seat, preventing direct contact with a spherical surface of the air bearing hemisphere and causing damage when the air source of the air bearing support seat is closed.

Preferably, as shown in FIGS. 1-4, the support frame comprises supporting leg columns 11 and a supporting flat plate 12, the supporting leg columns are installed below the supporting flat plate, and adjustable supporting leg columns are used to adjust height of the support frame.

Figure 2:
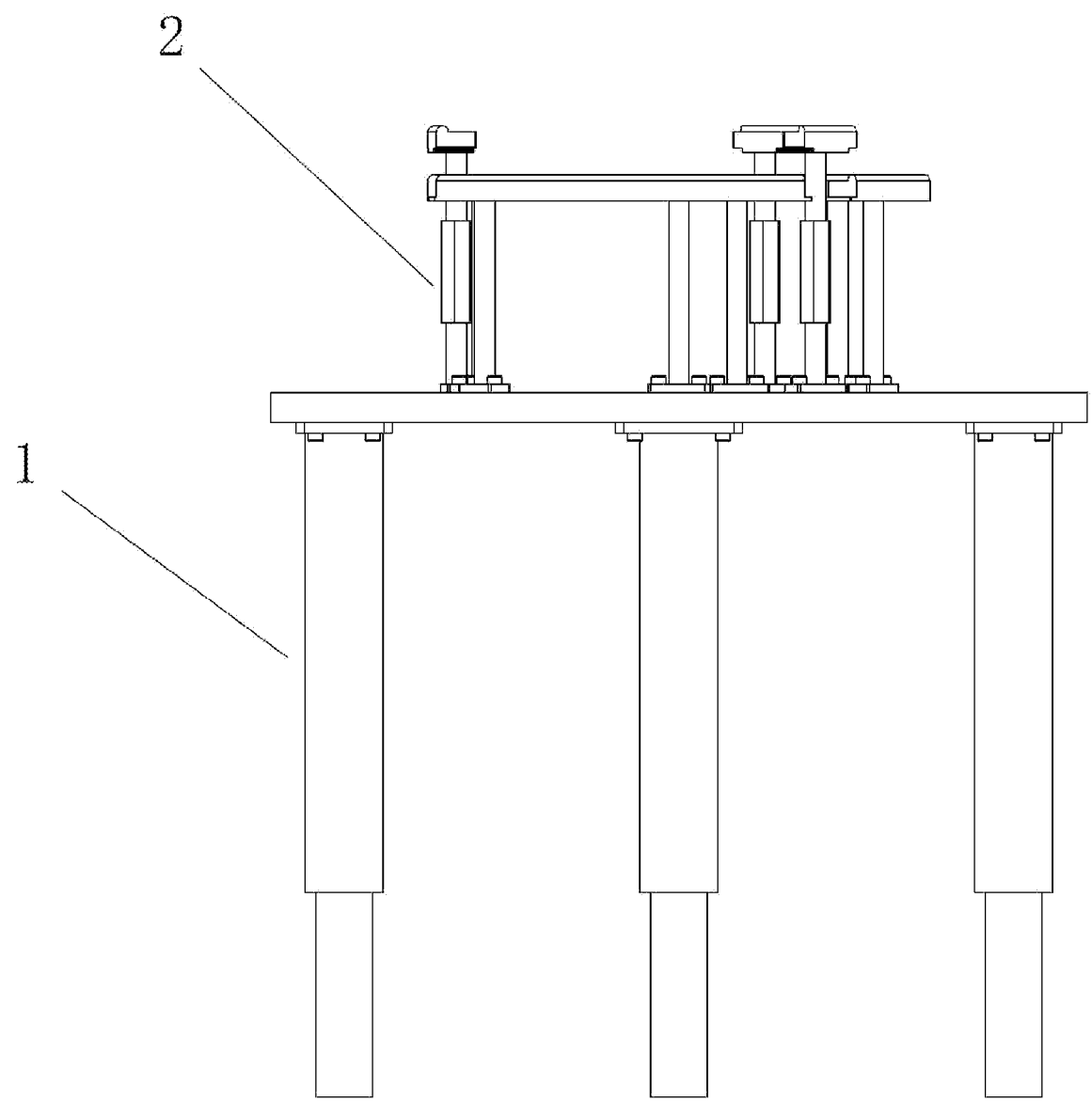
FIG. 2 shows a front view of FIG. 1.
Figure 4:
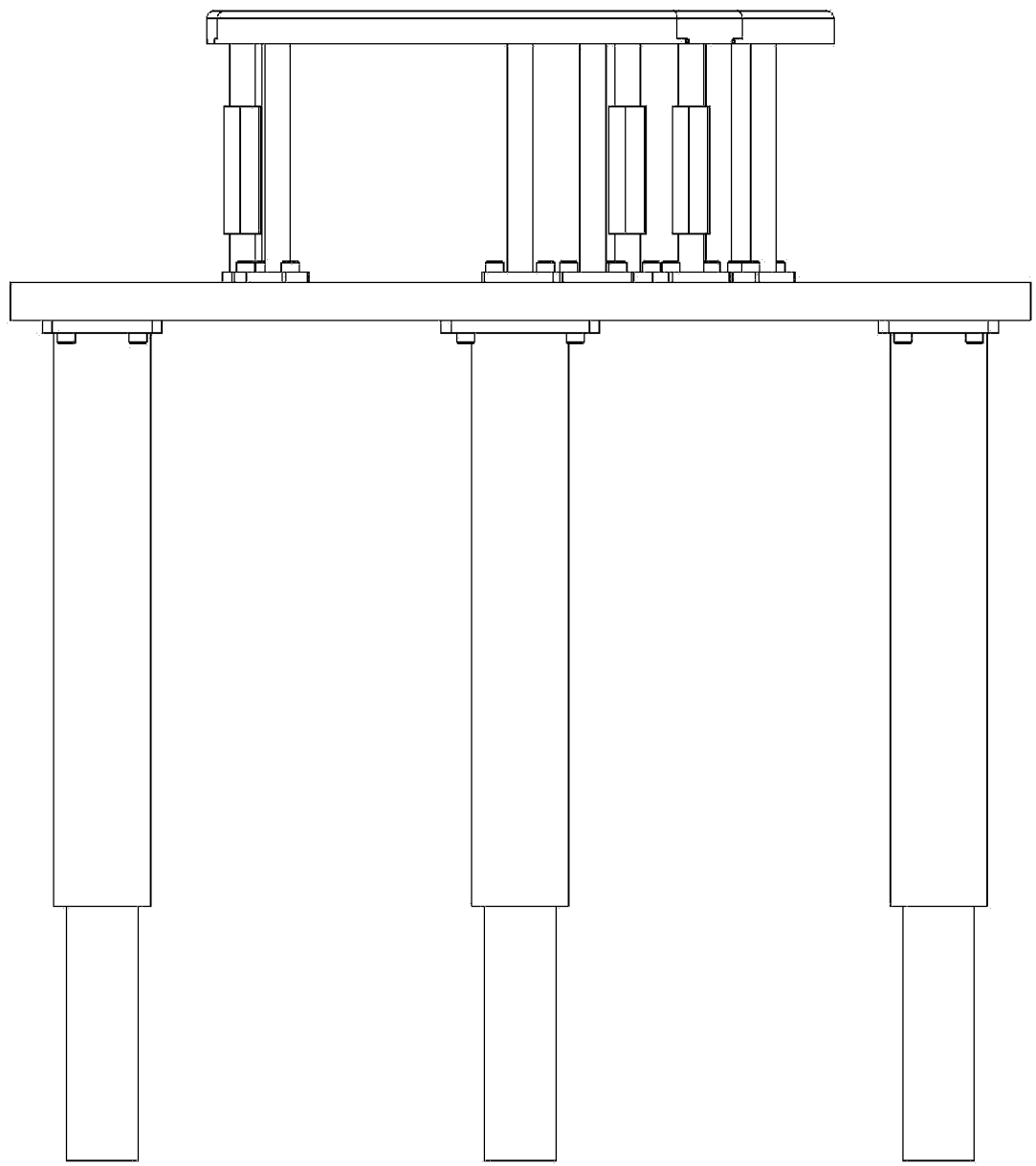
FIG. 4 shows a front view of FIG. 3.

Preferably, as shown in FIGS. 2, 4, the number of the supporting leg columns is three, evenly distributed below the supporting flat plate. This can make the support more stable, and because there are only three supporting legs, it is easier to adjust.

Preferably, as shown in FIG. 1, a section of positive thread is below each top rod, which is installed at one end of the positive thread of a double headed nut 23, a reverse thread end of the double headed nut is connected to a fixed rod 24, and a section of reverse thread is above the fixed rod. Each annular part is fixed to the supporting flat plate by two limit bracket legs 25. Adopting this design has a simple structure, convenient adjustment, and can ensure consistent height of the three top rods.

Preferably, as shown in FIGS. 1-4, each annular part is fixed to the supporting flat plate by two position limit bracket legs 25. This design has a simple structure and is convenient for the installation and observation of the air flotation platform.

Figure 3:
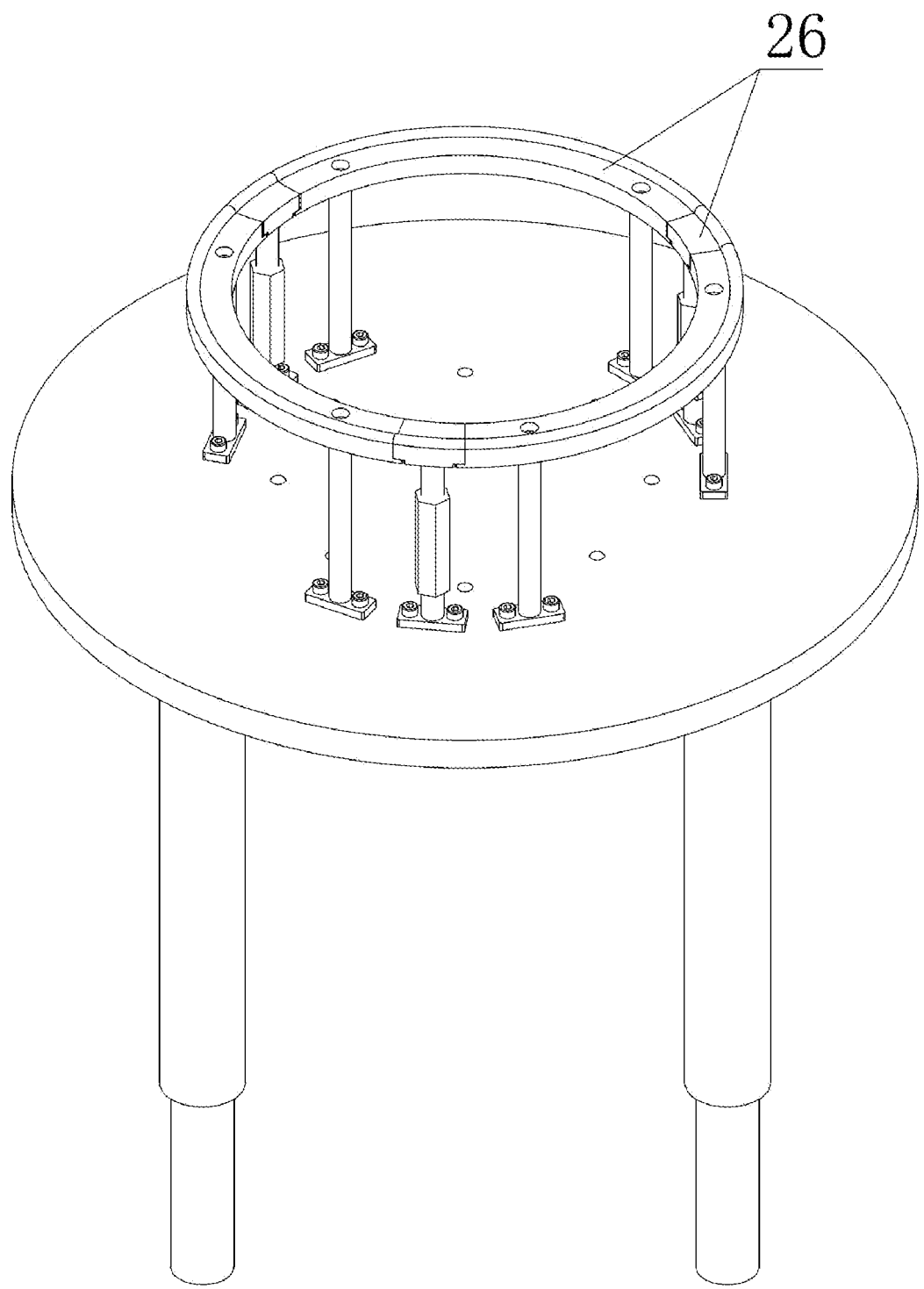
FIG. 3 is a schematic diagram showing the position limiting protection device for a test platform of a triaxial air-bearing turntable according to the present invention, where the top rods are at the same height as the annular parts.

Preferably, as shown in FIGS. 1, 3, the annular part and the top rod both comprise an L-shaped step 26, and a top of the step has an arc chamfer. By using steps, the test platform can be stuck at the bottom of the steps during deflection, while leaned against the upper part of the steps, further preventing the test platform from overturning or exceeding the set deflection angle.

Preferably, as shown in FIGS. 1, 3, at each end of the annular part, there is a small protrusion 27 at the lower part, each top rod has two corresponding small grooves 28, when the top rod descends to the point where the small grooves come into contact with the small protrusions, it prevents the top rod from continuing to descend, so that the top of the step of the top rod is level with the top of the steps of the annular part.

A Working Method for the Position Limiting Protection Device for a Test Platform of a Triaxial Air-Bearing Turntable is Also Provided, which, Comprising the Following Steps:
(1) preventing the test platform from overturning, when the test platform is not leveled and the test platform tilts towards one side,
(2) preventing the test platform from exceeding a set deflection angle when an executing mechanism controls the test platform to pitch or roll, and
(3) preventing the test platform from directly contacting the air bearing hemisphere, causing damage, when the air source of the air bearing support seat is turned off, after the test platform completes the test, the position limiting protection device controls the top rod to move upwards until the top rod presses against the test platform and moves a certain distance to separate the air bearing hemisphere located below the test platform from the air bearing support seat.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A position limiting protection device for a test platform of a triaxial air-bearing turntable, wherein the triaxial air-bearing turntable is installed on a support frame and comprises an air bearing support seat and an air bearing hemisphere, the air bearing support seat provides high-pressure gas lubrication to make the air bearing hemisphere freely roll and rotate in a ball socket of the air bearing support seat, the test platform is placed on an adapter plate, the adapter plate is placed above the air bearing hemisphere, the position limiting protection device comprises three top rods and three annular parts, the three top rods and the three annular parts are sequentially spaced to form a position limiting ring, the position limiting ring is located below the adapter plate and surrounds the air bearing hemisphere; the position limiting ring is spaced at a predetermined distance from the air bearing hemisphere, each of the three annular parts is fixed on the support frame, and the three top rods are controlled to rise or fall to limit a movement of the test platform, wherein the support frame comprises supporting leg columns and a supporting flat plate, the supporting leg columns are installed below the supporting flat plate, and the supporting leg columns are adjustable and configured to adjust height of the support frame, the number of the supporting leg columns is three, and the three supporting leg columns are evenly distributed below the supporting flat plate, a section of positive thread is below each of the three top rods, wherein each of the three top rods is installed at one end of the positive thread of a double headed nut, a reverse thread end of the double headed nut is connected to a fixed rod, and a section of reverse thread is above the fixed rod; each of the three annular parts is fixed to the supporting flat plate by two limit bracket legs, each of the three annular parts is fixed to the supporting flat plate by the two limit bracket legs, the annular part and the top rod both comprise an L-shaped step, and a top of the L-shaped step has an arc chamfer.

2. The position limiting protection device for the test platform of the triaxial air-bearing turntable according to claim 1, wherein at each end of the annular part, there is a small protrusion at the lower part, each of the three top rods has two corresponding small grooves, when the top rod descends to a point where the small grooves come into contact with the small protrusions, the top rod is prevented from continuing to descend, wherein the top of the L-shaped step of the top rod is level with the top of the L-shaped steps of the annular part.

3. A working method for the position limiting protection device for the test platform of the triaxial air-bearing turntable according to claim 2, wherein the working method comprises the following steps:

1) preventing the test platform from overturning, when the test platform is not leveled and the test platform tilts towards one side,
2) preventing the test platform from exceeding a set deflection angle when an executing mechanism controls the test platform to pitch or roll, and
3) preventing the test platform from directly contacting the air bearing hemisphere, causing damage, when an air source of the air bearing support seat is turned off, after the test platform completes the test, the position limiting protection device controls the top rod to move upwards until the top rod presses against the test platform and moves a predetermined distance to separate the air bearing hemisphere located below the test platform from the air bearing support seat.

4. The working method for the position limiting protection device for the test platform of the triaxial air-bearing turntable according to claim 3, wherein in the step 3), rotating the double headed nut to drive the top rod upwards until the top rod presses against the test platform and moves a predetermined distance to separate the air bearing hemisphere located below the test platform from the air bearing support seat, wherein the air bearing support seat is prevented from direct contact with a spherical surface of the air bearing hemisphere to cause damage when closes the air source of the air bearing support seat.

* * * * *